(12) United States Patent
Yoshikawa et al.

(10) Patent No.: US 7,446,022 B2
(45) Date of Patent: Nov. 4, 2008

(54) WAFER LASER PROCESSING METHOD

(75) Inventors: Toshiyuki Yoshikawa, Tokyo (JP);
 Nobuyasu Kitahara, Tokyo (JP);
 Noboru Takeda, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/384,355

(22) Filed: Mar. 21, 2006

(65) Prior Publication Data

US 2006/0216911 A1 Sep. 28, 2006

(30) Foreign Application Priority Data

Mar. 25, 2005 (JP) ............................. 2005-088173

(51) Int. Cl.
 *H01L 21/301* (2006.01)
 *B23K 26/38* (2006.01)
(52) U.S. Cl. ..................................... 438/463
(58) Field of Classification Search ............ 219/121.67, 219/121.72, 121.69; 438/460, 461, 462, 438/463, 940
 See application file for complete search history.

(56) References Cited

U.S. PATENT DOCUMENTS

| | | | | |
|---|---|---|---|---|
| 3,699,644 | A * | 10/1972 | Cocca | 438/465 |
| 4,970,600 | A * | 11/1990 | Garnier et al. | 219/121.69 |
| 6,562,698 | B2 * | 5/2003 | Manor | 438/460 |
| 2003/0006221 | A1 * | 1/2003 | Hong et al. | 219/121.72 |
| 2003/0155333 | A1 * | 8/2003 | Ye et al. | 219/121.72 |
| 2004/0089644 | A1 * | 5/2004 | Sekiya | 219/121.72 |
| 2004/0112880 | A1 | 6/2004 | Sekiya | |
| 2005/0090077 | A1 * | 4/2005 | Nagai et al. | 438/463 |
| 2005/0186760 | A1 * | 8/2005 | Hashimura et al. | 438/460 |
| 2006/0105544 | A1 * | 5/2006 | Takanashi et al. | 438/460 |
| 2006/0249816 | A1 * | 11/2006 | Li et al. | 438/463 |
| 2007/0173036 | A1 * | 7/2007 | Kusunoki | 438/465 |

FOREIGN PATENT DOCUMENTS

| | | | | |
|---|---|---|---|---|
| JP | 58-143553 | A | * | 8/1983 |
| JP | 3-99479 | A | * | 4/1991 |
| JP | 5-211381 | A | * | 8/1993 |
| JP | 8-10970 | A | * | 1/1996 |
| JP | 10-305420 | | | 11/1998 |
| JP | 2001-345252 | A | * | 12/2001 |
| JP | 2004-188475 | | | 7/2004 |

* cited by examiner

*Primary Examiner*—Geoffrey S Evans
(74) *Attorney, Agent, or Firm*—Smith, Gambrell & Russell, LLP

(57) ABSTRACT

A wafer laser processing method for forming a groove in a wafer having a protective film on the processing surface of a substrate along a predetermined processing line, comprising a first step for forming a first groove in the protective film along the dividing lines by applying a first pulse laser beam set to an output at which the protective film can be processed but the substrate can not be processed, to the protective film along the processing lines; and a second step for forming a second groove in the substrate along the first grooves by applying a second pulse laser beam set to an output at which the substrate can be processed, along the first grooves.

3 Claims, 6 Drawing Sheets

(a)

(b)

(a)

(b)

WAFER LASER PROCESSING METHOD

FIELD OF THE INVENTION

The present invention relates to a wafer laser processing method for forming a groove along a predetermined line in a wafer such as a semiconductor wafer, an optical device wafer or the like, specifically a wafer having a protective film formed on the processing surface of a substrate.

DESCRIPTION OF THE PRIOR ART

As is known to people of ordinary skill in the art, a semiconductor wafer having a plurality of semiconductor chips such as IC's or LSI's which are composed of a laminate in which an insulating film and a functional film are laminated and are formed in a matrix on the front surface of a semiconductor substrate such as a silicon substrate or the like is formed in the production process of a semiconductor device. The above semiconductor chips are sectioned by dividing lines called "streets" in the thus-formed semiconductor wafer, and individual semiconductor chips are manufactured by cutting the semiconductor wafer along the dividing lines. An optical device wafer having a plurality of areas which are sectioned by dividing lines formed in a lattice pattern on the front surface of a sapphire substrate, and optical devices, which are composed of a gallium nitride-based compound semiconductor layer and are formed in the sectioned areas, is divided along the dividing lines into individual optical devices such as light emitting diodes or laser diodes which are widely used in electric appliances.

Cutting along the dividing lines of the above semiconductor wafer or optical device wafer is generally carried out by using a cutting machine called "dicer". This cutting machine comprises a chuck table for holding a semiconductor wafer as a workpiece, a cutting means for cutting the semiconductor wafer held on the chuck table, and a cutting-feed means for moving the chuck table and the cutting means relative to each other. The cutting means comprises a rotary spindle which is rotated at a high speed and a cutting blade mounted on the spindle.

Meanwhile, as a means of dividing a plate-like workpiece such as a semiconductor wafer, JP-A10-305420 discloses a method comprising applying a pulse laser beam along dividing lines formed on a workpiece to form grooves and dividing the workpiece along the grooves by a mechanical breaking apparatus.

Laser processing can have a higher processing speed than cutting processing, and is capable of processing even a wafer made of a very hard material such as sapphire relatively easily. When a laser beam is applied along the dividing lines of the wafer, however, heat energy is concentrated on an area to which the laser beam is applied, thereby producing debris. The debris cause a new problem that they adhere to a device such as a circuit to reduce the quality of a chip.

To solve the above problem caused by debris, JP-A 2004-188475 discloses a laser processing method in which a protective film of a polyvinyl alcohol is formed on the processing surface of a wafer and a laser beam is applied to the wafer through the protective film.

When a laser beam is applied along the dividing lines through the protective film formed on the front surface of the wafer to form a groove in the wafer along the dividing lines, however, the protective film is partially peeled off by explosive force at the time of applying the laser beam, thereby making it impossible to exhibit the function of the protective film sufficiently.

SUMMARY OF THE INVENTION

It is an object of the present invention to provide a wafer laser processing method capable of forming a groove without peeling off a protective film even when a laser beam is applied through the protective film formed on the processing surface of a wafer.

To attain the above object, according to the present invention, there is provided a wafer laser processing method for forming a groove in a wafer having a protective film formed on a processing surface of a substrate along a predetermined processing line, comprising:

a first step for forming a first groove in the protective film along the dividing lines by applying a first pulse laser beam that is set to an output at which the protective film can be processed but the substrate can not be processed, to the protective film along the processing lines; and a second step for forming a second groove in the substrate along the first grooves by applying a second pulse laser beam that is set to an output at which the substrate can be processed, along the first grooves.

The output of the above first pulse laser beam is set to 10 to 20% of the output of the above second pulse laser beam.

According to the present invention, since the first pulse laser beam applied in the first step is set to an output at which the protective film can be processed but the substrate can not be processed, the first grooves can be formed without peeling the protective film. Although debris are produced in the second step for forming the second groove in the substrate along the first grooves, as the protective tape is not peeled off, the debris adhere onto the protective film and not to a device.

DETAILED DESCRIPTION OF THE PREFERRED EMBODIMENT

A preferred embodiment of the wafer laser processing method of the present invention will be described in detail hereinunder with reference to the accompanying drawings.

Figure 1:
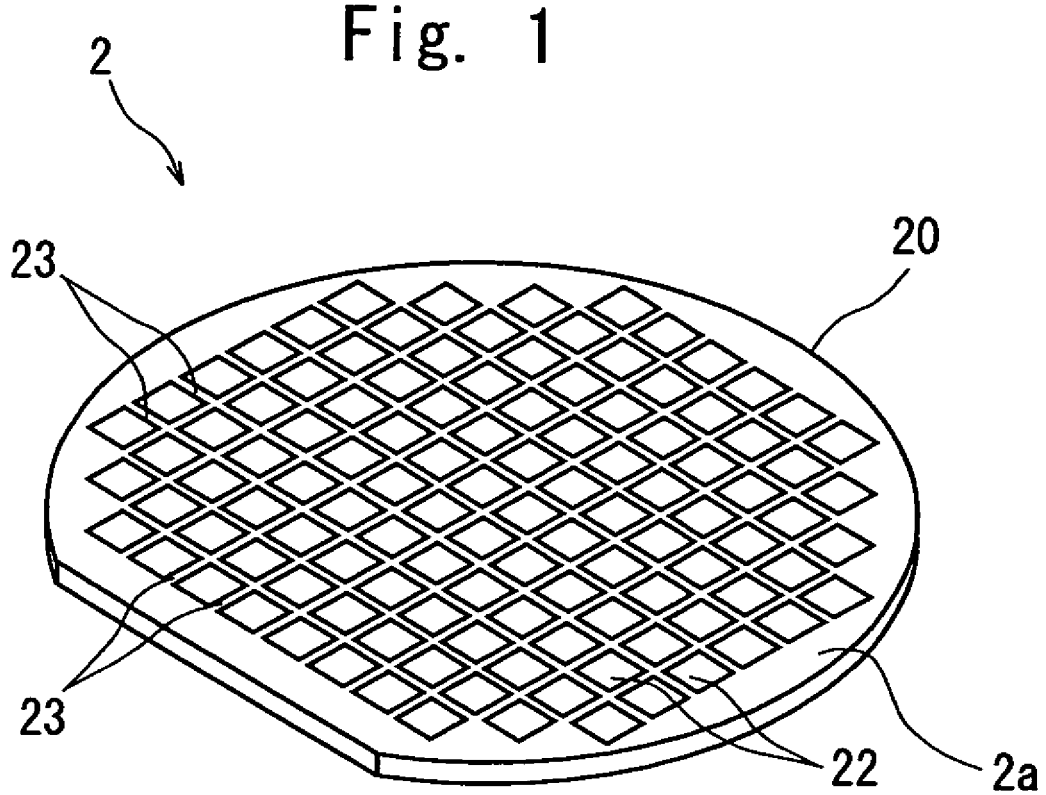
FIG. 1 is a perspective view of an optical device wafer as a wafer to be processed by the present invention.
Figure 2:
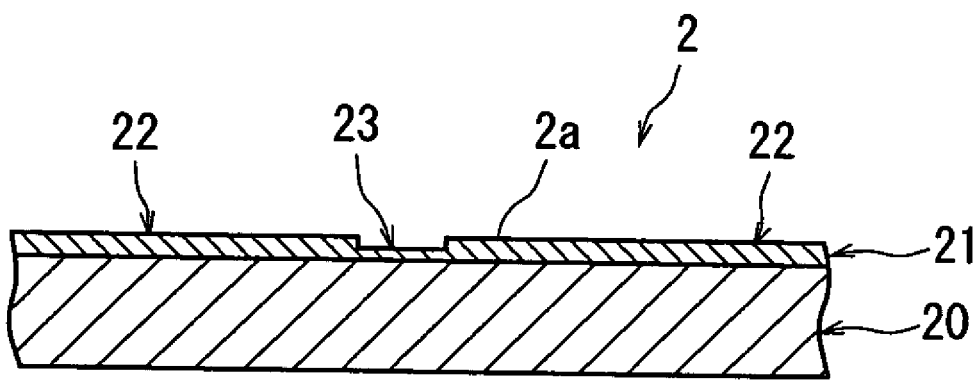
FIG. 2 is an enlarged sectional view of the principal portion of the optical device wafer shown in FIG. 1.
Figure 3:
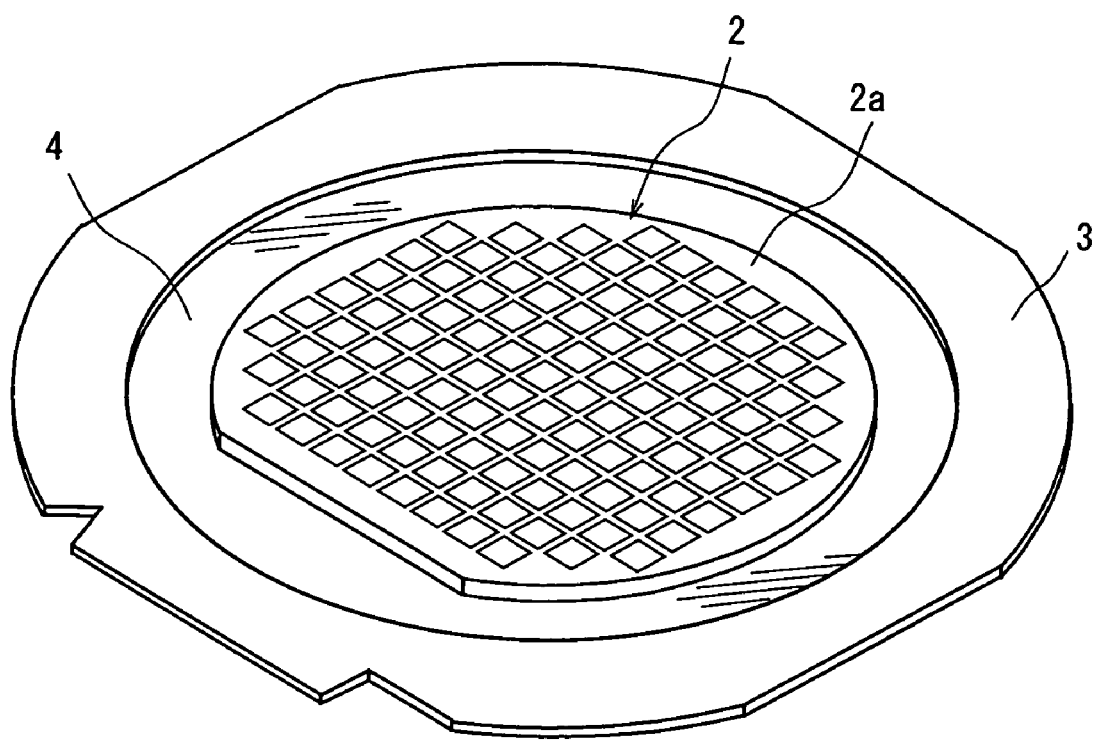
FIG. 3 is a perspective view showing a state where the optical device wafer shown in FIG. 1 is put on a protective tape mounted on an annular frame.

FIG. 1 is a perspective view of an optical device wafer to be processed by the wafer laser processing method of the present invention, and FIG. 2 is an enlarged sectional view of the principal portion of the optical device wafer shown in FIG. 1. In the optical device wafer 2 shown in FIG. 1 and FIG. 2, a plurality of devices 22 which are composed of a device layer 21 formed of gallium nitride (GaN), aluminum nitride-gallium (AlGaN) or the like are formed in a matrix on the front surface of a sapphire substrate 20. The devices 22 are sectioned by dividing lines 23 formed in a lattice pattern. The back surface of the optical device wafer 2 constituted as described above is put on a protective tape 4 mounted on an annular frame 3 in such a manner that the front surface 2a as the processing surface faces up, as shown in FIG. 3.

Figure 4:
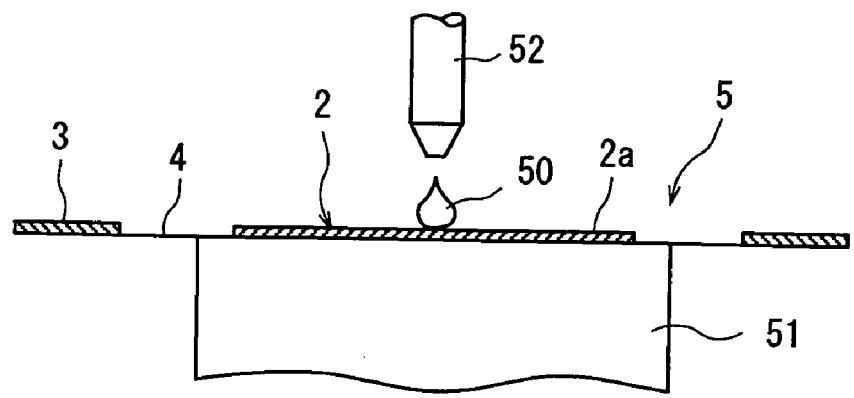
FIG. 4 is a sectional view showing a state where a liquid resin is dropped in the step of forming a protective film on the processing surface of the optical device wafer shown in FIG. 1.

Next comes the step of forming a protective film on the front surface 2a as the processing surface of the optical device wafer 2. This protective film forming step will be described with reference to FIG. 4 and FIGS. 5(a) to 5(e). In the protective film forming step, the optical device wafer 2 supported to the annular frame 3 through the protective tape 4 is first placed on the spinner table 51 of a protective film forming apparatus 5, as shown in FIG. 4. The optical device wafer 2 is held on the spinner table 51 by activating a suction means that is not shown. At this point, the annular frame 3 is also fixed by frame clamps (not shown) mounted on the spinner table 51. After the optical device wafer 2 is held on the spinner table 51 as described above, a predetermined amount of a liquid resin 50 is dropped on the center area of the front surface 2a as the processing surface of the optical device wafer 2 from a resin liquid supply nozzle 52 arranged above the spinner table 51. The liquid resin 50 is desirably a water-soluble resist such as PVA (polyvinyl alcohol), PEG (polyethylene glycol) or PEO (polyethylene oxide).

Figure 5:
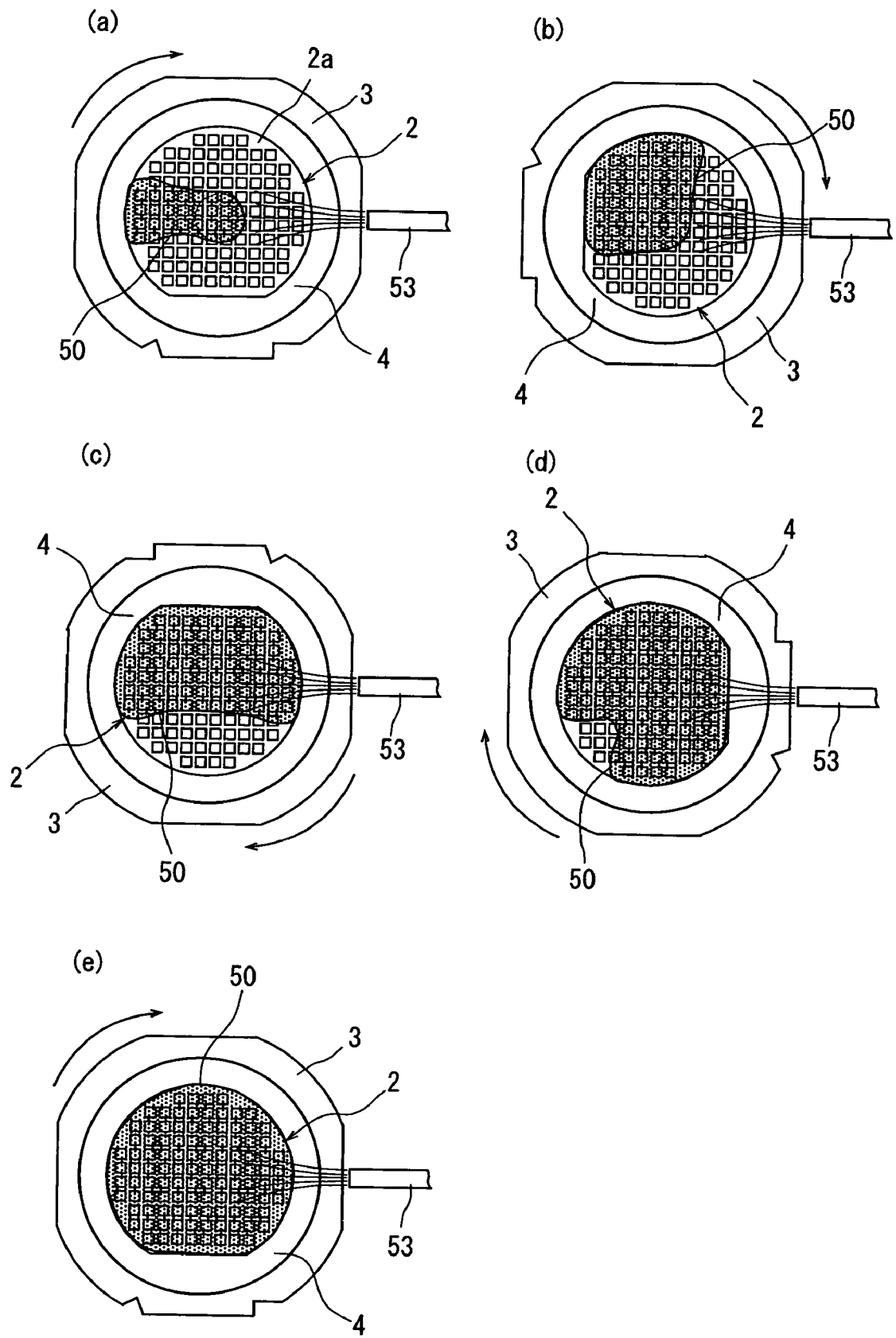
FIGS. 5(a) to 5(e) are explanatory diagrams showing the step of forming the protective film on the processing surface of the optical device wafer shown in FIG. 1.
Figure 6:
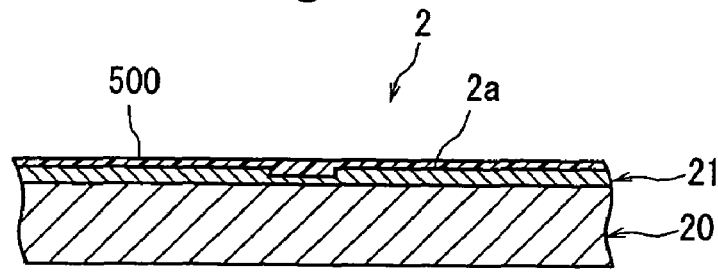
FIG. 6 is an enlarged sectional view of the principal portion of the optical device wafer which has undergone the protective film forming step.

After the predetermined amount of the liquid resin 50 is dropped on the center area of the front surface 2a as the processing surface of the optical device wafer 2, air is blown toward the liquid resin 50 dropped on the front surface 10a as the processing surface of the optical device wafer 2 from an air nozzle 53 arranged in the lateral direction of the spinner table 51 while the spinner table 51 (see FIG. 4), therefore, the optical device wafer 2 is turned in the direction indicated by the arrow shown in FIGS. 5(a) to 5(e). At this point, air from the air nozzle 53 is blown toward the outer periphery through the center area of the optical device wafer 2. The revolution of the spinner table 51 is 1 to 100 rpm and the pressure of air from the air nozzle 53 is about 0.4 MPa. By blowing air toward the liquid resin 50 from the air nozzle 53 while the optical device wafer 2 is turned as described above, the liquid resin 50 dropped on the center area of the front surface 2a as the processing surface of the optical device wafer 2 is caused to run toward the outer periphery of the optical device wafer 2 in the order of FIGS. 5(a), 5(b), 5(c) and 5(d). After one turn of the optical device wafer 2, then, the revolution of the optical device wafer 2 is stopped and the supply of air from the air nozzle 53 is suspended, as shown in FIG. 5(e). As a result, a protective film 500 of the liquid resin is uniformly formed on the front surface 2a as the processing surface of the optical device wafer 2, as shown in FIG. 6. This protective film 500 whose thickness is determined by the amount of the liquid resin supplied in the above resin dropping step can be made as thin as about 1 to 10 μm. Then, the spinner table 51, therefore, the optical device wafer 2 is rotated at 500 to 3,000 rpm in the predetermined direction for about 30 seconds to dry the protective film 500.

After the protective film 500 is formed on the front surface 2a as the processing surface of the optical device wafer 2 by the above protective film forming step, laser processing for forming a groove along the dividing lines (processing lines) 23 formed on the optical device wafer 2 is carried out. This laser processing is carried out by using a laser beam processing machine 6 shown in FIG. 7. The laser beam processing machine 6 shown in FIG. 7 comprises a chuck table 61 for holding a workpiece and a laser beam application means 62 for applying a laser beam to the workpiece held on the chuck table 61. The chuck table 61 is constituted to suction-hold the workpiece, and is designed to be moved in a processing-feed direction indicated by an arrow X in FIG. 7 by a processing-feed mechanism (not shown) and in an indexing-feed direction indicated by an arrow Y in FIG. 7 by an indexing-feed mechanism that is not shown.

Figure 7:
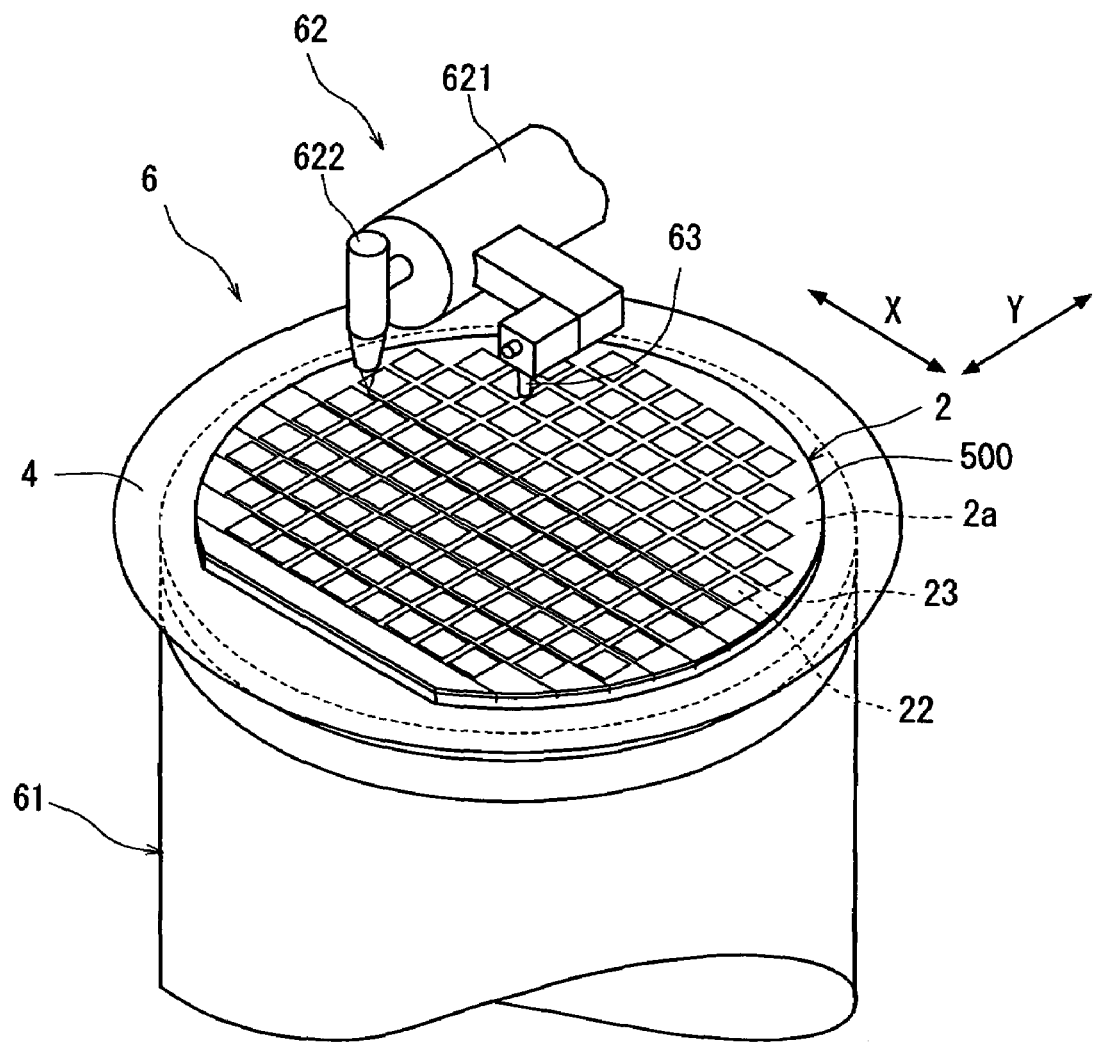
FIG. 7 is a perspective view of the principal portion of a laser beam processing machine for carrying out the wafer laser processing method of the present invention.

The above laser beam application means 62 applies a pulse laser beam from a condenser 622 mounted on the end of a cylindrical casing 621 arranged substantially horizontally. The illustrated laser beam processing machine 6 has an image pick-up means 63 that is mounted on the end portion of the casing 621 constituting the above laser beam application means 62, as shown in FIG. 7. This image pick-up means 63 is constituted by an infrared illuminating means for applying infrared radiation to the workpiece, an optical system for capturing the infrared radiation applied by the infrared illuminating means, and an image pick-up device (infrared CCD) for outputting an electric signal corresponding to the infrared radiation captured by the optical system, in addition to an ordinary image pick-up device (CCD) for picking up an image with visible radiation in the illustrated embodiment. An image signal is supplied to a control means (not shown) which will be described later.

A description will be subsequently given of laser processing for forming a groove along the dividing lines (processing lines) 23 formed on the optical device wafer 2 by using the above laser beam processing machine 6.

The optical device wafer 2 that has undergone the above protective film forming step is first placed on the chuck table 61 of the laser beam processing machine 6 shown in FIG. 7 and suction-held on the chuck table 61. At this point, the optical device wafer 2 is supported in such a manner that the front surface 2a (processing surface) having the protective film 500 formed thereon faces up. Although the annular frame 3 supporting the protective tape 4 affixed to the optical device wafer 2 is not shown in FIG. 7, it is fixed by frame holding clamps (not shown) mounted on the chuck table 61.

The chuck table 61 suction-holding the optical device wafer 2 is brought to a position right below the image pick-up means 63 by the processing-feed mechanism that is not shown. After the chuck table 61 is positioned right below the image pick-up means 63, alignment work for detecting the area to be processed of the optical device wafer 2 is carried out by the image pick-up means 63 and the control means that is not shown. That is, the image pick-up means 63 and the control means (not shown) carry out image processing such as pattern matching, etc. to align a dividing line (processing line) 23 formed in a predetermined direction of the optical device wafer 2 with the condenser 622 of the laser beam application means 62 for applying a laser beam along the dividing line (processing line) 23, thereby performing the alignment of a laser beam application position. The alignment of the laser beam application position is also carried out on dividing lines (processing lines) 23 formed on the optical device wafer 2 in a direction perpendicular to the above predetermined direction. Although the protective film 500 is formed on the front surface 2a having the dividing lines (processing lines) 23 of the optical device wafer 2 at this point, when the protective film 500 is not transparent, alignment can be carried out from the front surface by picking up images of the dividing lines (processing lines) 23 with infrared radiation.

Figure 8:
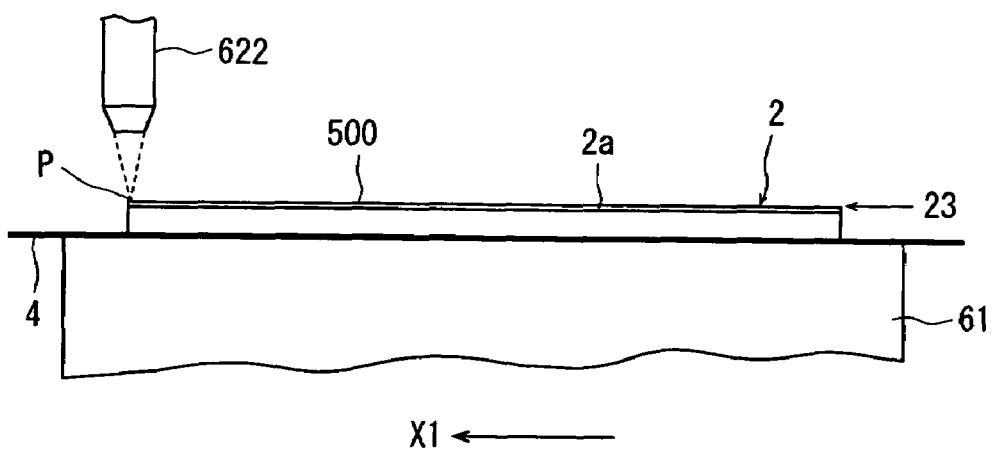
FIGS. 8(a) and 8(b) are explanatory diagrams showing the first step in the wafer laser processing method of the present invention.
Figure 8:
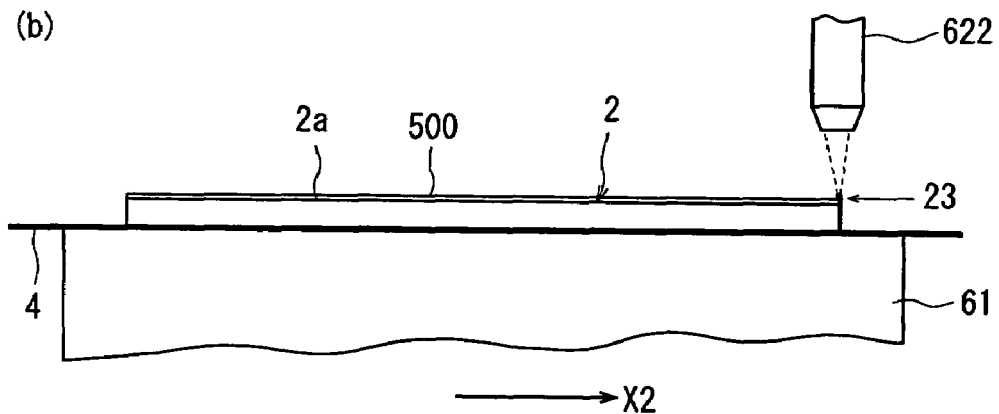

After the dividing line (processing line) 23 formed on the optical device wafer 2 held on the chuck table 61 is detected and the alignment of the laser beam application position is carried out as described above, the chuck table 61 is moved to a laser beam application area where the condenser 622 of the laser beam application means 62 for applying a laser beam is located as shown in FIG. 8(a) so as to bring the predetermined dividing line (processing line) 23 to a position right below the condenser 622. At this point, the optical device wafer 2 is positioned such that one end (left end in FIG. 8 (a)) of the dividing line (processing line) 23 is located right below the condenser 622, as shown in FIG. 8(a). Next comes the first step for forming a first groove along the dividing line (processing line) 23 in the protective film 500 by applying a first pulse laser beam set to an output at which the protective film 500 can be processed but not the substrate 20 to the top surface of the protective film 500 along the dividing line (processing line) 23. That is, the chuck table 61, that is, the optical device wafer 2 is moved in the direction indicated by the arrow X1 in FIG. 8(a) at a predetermined processing-feed rate while the first pulse laser beam is applied from the condenser 622 of the laser beam application means 62. When the other end (right end in FIG. 8(b)) of the dividing line (processing line) 23 reaches a position right below the condenser 622 as shown in FIG. 8(b), the application of the pulse laser beam is suspended and the movement of the chuck table 61, that is, the optical device wafer 2 is stopped. In this first step, the focusing point P of the pulse laser beam is set to a position near the front surface of the protective film 500 formed on the front surface 2a of the optical device wafer 2.

Figure 9:
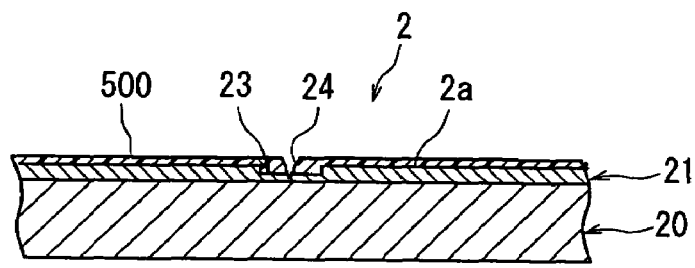
FIG. 9 is an enlarged sectional view of the principal portion of the optical device wafer processed by the first step shown in FIGS. 8(a) and 8(b)

By carrying out the above first step, a first groove 24 is formed in the protective film 500 formed on the front surface 2a of the optical device wafer 2 along the predetermined dividing line (processing line) 23 as shown in FIG. 9. At this point, since the first pulse laser beam applied is set to an output at which the protective film 500 can be processed but not the wafer substrate 20 as described above, the substrate 20 is not processed though the first groove 24 is formed in the protective film 500 and part of the device layer 21. Therefore, the protective film 500 is not peeled out. The output of the first pulse laser beam is suitably 10 to 20% of the output of a second pulse laser beam which will be described later.

The above first step is carried out under the following processing conditions, for example.

Light source of laser beam: YVO4 laser or YAG laser
Wavelength: 355 nm
Repetition frequency: 50 kHz
Output: 0.5 W
Focusing spot diameter: 9.2 82 m
Processing-feed rate: 100 mm/sec After the above first step is carried out along all the dividing lines (processing lines) 23 formed in the predetermined direction of the optical device wafer 2, the chuck table 61, therefore, the optical device wafer 2 is turned at 90°. The above first step is carried out along all the dividing lines (processing lines) 23 formed on the optical device wafer 2 in a direction perpendicular to the above predetermined direction.

After the above first step is carried out along all the dividing lines (processing lines) 23 formed on the optical device wafer 2 to form the first groove 24 in the protective film 500 formed on the front surface 2a of the optical device wafer 2 along all the dividing lines (processing lines) 23, next comes the second step for forming a second groove in the substrate along the first grooves 24 by applying a second pulse laser beam set to an output at which the substrate 20 can be processed along the first grooves 24. This second step is carried out by using the laser beam processing machine 6 shown in FIG. 7 and the second pulse laser beam set to an output higher than the output of the first pulse laser beam in the first step, at which the substrate 20 can be processed.

The second step will be described in detail with reference to FIGS. 10(a) and 10(b) and FIG. 11.

Figure 10:
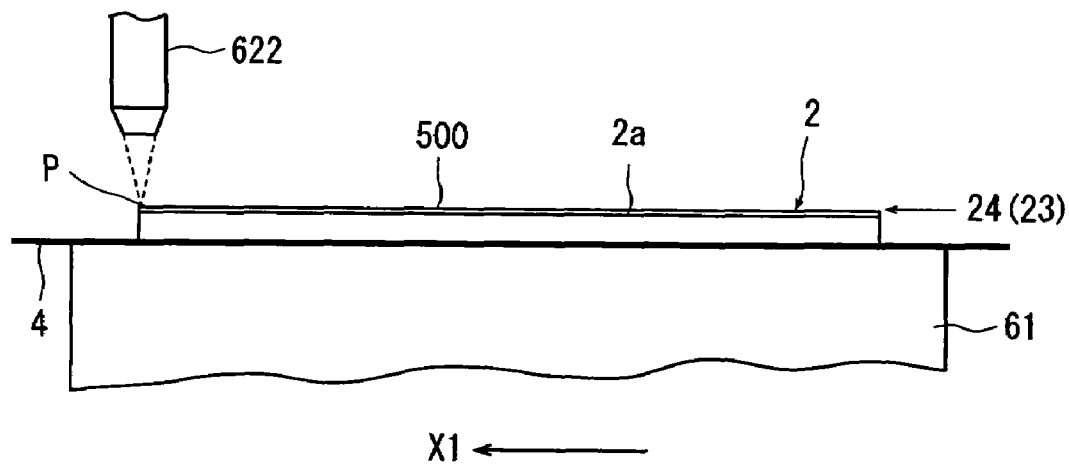
FIGS. 10(a) and 10(b) are explanatory diagrams showing the second step in the wafer laser processing method of the present invention.
Figure 10:
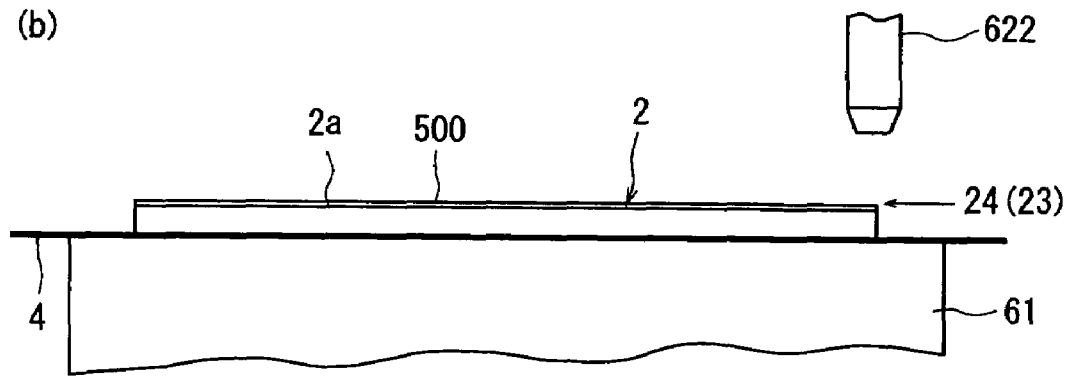

The chuck table 61 holding the optical device wafer 2 which has undergone the above first step is moved to the laser beam application area where the condenser 622 of the laser beam application means 62 for applying a laser beam is located so as to bring a predetermined dividing line (processing line) 23 (where the first groove 24 has been formed) to a position right below the condenser 622. The first groove 24 formed in the dividing line (processing line) 23 is aligned with the application position of the laser beam from the condenser 622. At this point, the optical device wafer 2 is positioned such that one end (left end in FIG. 10 (a)) of the dividing line (processing line) 23 is located right below the condenser 622, as shown in FIG. 10(a). The chuck table 61, that is, the optical device wafer 2 is then moved in the direction indicated by the arrow X1 in FIG. 10(a) at a predetermined processing-feed rate while the second pulse laser beam is applied from the condenser 622 of the laser beam application means 62. The output of the second pulse laser beam applied in this second step is higher than that of the first pulse laser beam in the first step and is set to a value at which the substrate 20 can be processed. When the other end (right end in FIG. 10 (b)) of the dividing line (processing line) 23 reaches a position right below the condenser 622 as shown in FIG. 10(b), the application of the pulse laser beam is suspended and the movement of the chuck table 61, that is, the optical device wafer 2 is stopped. In this second step, the focusing point P of the second pulse laser beam is set to a position near the front surface of the substrate 20 of the optical device wafer 2.

Figure 11:
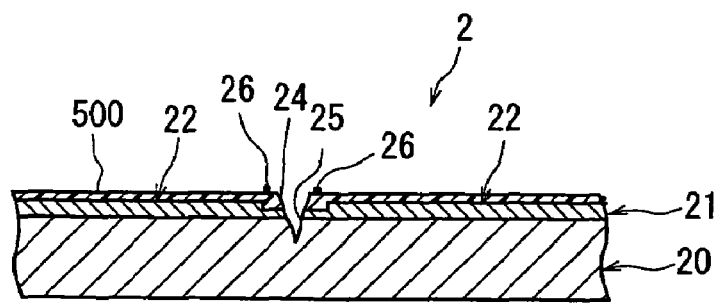
FIG. 11 is an enlarged sectional view of the principal portion of the optical device wafer processed by the second step shown in FIGS. 10(a) and 10(b).

By carrying out the above second step, a second groove 25 having a predetermined depth is formed in the substrate 20 of the optical device wafer 2 along the dividing line (processing line) 23 where the first groove 24 has been formed, as shown in FIG. 11. The depth of the groove 25 may be, for example, 1/5 of the thickness of the substrate 20 of the optical device wafer 2. Although in this second step, the substrate 20 is processed by the second pulse laser beam thereby producing debris, the debris 26 adhere onto the protective film 500 in this case as shown in FIG. 11, because the protective film 500 formed on the front surface of the device layer 21 of the optical device wafer 2 is not peeled off at the time when the first grooves 24 are formed,. Thus, even when the debris 26 are produced in the second step, they are blocked by the function of the protective film 500 and do not adhere to a device 22.

The above second step is carried out under the following processing conditions, for example.

Light source of laser beam: YVO4 laser or YAG laser
Wavelength: 355 nm
Repetition frequency: 30 kHz
Output: 3.5 W
Focusing spot diameter: 9.2 μm
Processing-feed rate: 600 mm/sec After the above second step is carried out along the first grooves 24 formed in all the dividing lines (processing lines)

23 formed in the predetermined direction of the optical device wafer 2, the chuck table 61, therefore, the optical device wafer 2 is turned at 90°. The above second step is carried out along the first grooves 24 formed in all the dividing lines (processing lines) 23 formed on the optical device wafer 2 in a direction perpendicular to the above predetermined direction.

After the first step and the second step are carried out as described above, the step of removing the protective film 500 formed on the front surface 2a of the optical device wafer 2 is carried out. In this protective film removing step, as the protective film 500 is made of a water-soluble resin as described above, the protective film 500 can be washed away with water. On this occasion, the debris 26 that are produced in the second step and adhere onto the surface of the protective film 500 are flushed away together with the protective film 500. Thus, since the protective film 500 is made of a water-soluble resin in this illustrated embodiment, it can be washed away with water and hence, it is extremely easy to remove the protective film 500.

After the above protective film removing step, the optical device wafer 2 is carried to the subsequent dividing step. In the dividing step, as the second grooves 25 formed along the dividing lines (processing lines) 23 of the optical device wafer 2 are so deep that the optical device wafer 10 can be easily divided, the optical device wafer 10 can be easily divided by mechanical breaking.

While an example in which the present invention is applied to an optical device wafer has been described above, the same effect and function are obtained even when the present invention is applied to laser processing along the dividing lines of a semiconductor wafer having a plurality of circuits formed on the front surface of a substrate.

What is claimed is:

1. A laser processing method for forming a groove in a wafer with a protecting film thereon, along a predetermined dividing line, said wafer including a substrate having a processing surface on which is formed said protecting film, said method comprising the steps of:

applying to the protecting film, along the dividing line, a first pulse laser beam that is set to a first output which can process the protecting film but cannot process the substrate under the protecting film, to form a first groove in the protective film along the dividing line;

applying along the dividing line a second pulse laser beam that is set to a second output which is higher than the first output and which can process the substrate, to form a second groove in the substrate along the dividing line;

wherein the first pulse laser bean and the second pulse laser beam are applied by a common laser beam application means; and removing the protective film and dividing the wafer by mechanical breaking along the dividing line.

2. The laser processing method according to claim 1, wherein the first pulse laser beam is applied to the protecting film with a focusing point set to a position adjacent to an outer surface of the protecting film.

3. The laser processing method according to claim 1, wherein the first output is set to 10 to 20% of the second output.

* * * * *